United States Patent
Sano

(10) Patent No.: US 8,846,804 B2
(45) Date of Patent: Sep. 30, 2014

(54) NBR COMPOSITION AND SEALING RUBBER MATERIAL

(75) Inventor: Hiroyuki Sano, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 13/698,195

(22) PCT Filed: Jul. 28, 2011

(86) PCT No.: PCT/JP2011/067355
§ 371 (c)(1),
(2), (4) Date: Nov. 15, 2012

(87) PCT Pub. No.: WO2012/026283
PCT Pub. Date: Mar. 1, 2012

(65) Prior Publication Data
US 2013/0072610 A1    Mar. 21, 2013

(30) Foreign Application Priority Data

Aug. 25, 2010  (JP) .................... 2010-188717

(51) Int. Cl.
  *C08K 5/00*   (2006.01)
  *C08L 91/06*  (2006.01)
  *C09K 3/10*   (2006.01)
  *C08L 9/02*   (2006.01)

(52) U.S. Cl.
  CPC .......... *C09K 3/10* (2013.01); *C09K 2200/0635* (2013.01); *C09K 2200/0612* (2013.01); *C08L 9/02* (2013.01)
  USPC .......................................... 524/515; 524/279

(58) Field of Classification Search
  USPC ........................................................ 524/515
  See application file for complete search history.

(56) References Cited

FOREIGN PATENT DOCUMENTS

| JP | 57125227 | A | * | 8/1982 | ................ C08L 9/02 |
| JP | 63256680 |   |   | 10/1988 | |
| JP | 03152141 | A | * | 6/1991 | ................ C08L 9/02 |
| JP | 04142347 | A | * | 5/1992 | ................ C08L 9/02 |
| JP | 11304058 |   |   | 11/1999 | |
| JP | 2000095899 |   |   | 4/2000 | |
| JP | 2001172433 |   |   | 6/2001 | |
| JP | 2006022220 |   |   | 1/2006 | |

OTHER PUBLICATIONS

Translation of JP04142347, May 15, 1992.*
Translation of JP57125227, Aug. 4, 1982.*
Abstract of JP03152141, Jun. 28, 1991.*

* cited by examiner

*Primary Examiner* — Hui Chin
(74) *Attorney, Agent, or Firm* — K. David Crockett, Esq.; Niky Economy Syrengelas, Esq.; Crockett & Crockett, PC

(57) ABSTRACT

Providing an NBR composition substantially free of containment of an insolubilized substance-generating causative substance so as to prevent generation of an insolubilized substance due to extraction by a fuel while which composition is excellent in ozone resistance, ejectability from kneader, and which composition realizes a first compression set and a second compression set which are both 46% or less. An NBR composition including a polymer obtained by mixing an acrylonitrile-butadiene rubber (NBR) with polyvinyl chloride (PVC), wherein the NBR composition is obtained without blending an insolubilized substance-generating causative substance, or, in case of blending, by blending an insolubilized substance-generating causative substance at an upper limit of 0.15 parts by weight or less, into 100 parts by weight of the polymer having a PVC content of 15.70 to 17.50 wt %.

3 Claims, No Drawings

NBR COMPOSITION AND SEALING RUBBER MATERIAL

FIELD OF THE INVENTIONS

The present invention relates to an NBR composition, which composition is substantially free of an insolubilized substance-generating causative substance so as to prevent generation of an insolubilized substance due to extraction by a fuel while which composition is excellent in ozone resistance, is easily ejected from the kneader, and the like, and which composition is adapted to realize a compression set, particularly a second compression set, of 46% or less; and to a sealing rubber material obtained by cross-linking the NBR composition.

BACKGROUND OF THE INVENTIONS

Packings, O-rings, and the like to be used around fuel tanks are each required to possess fuel oil resistance, ozone resistance, compression set, and low-temperature performance, as essential functions.

To exhibit such functions, rubber materials are used, each adopting a high nitrile polymer.

It is typical for such a sealing rubber material, to blend therein carbon black, zinc oxide, stearic acid, ozone-resistant wax, age resister, plasticizer, sulfur, and vulcanization accelerator.

However, it has been pointed out that, in case of adopting a product having the above components blended therein, those components extracted from the rubber by a fuel oil, particularly by an alcohol-containing fuel, are insolubilized, in a manner to possibly cause clogging of a fuel filter, thereby adversely affecting an internal combustion engine.

As a countermeasure thereto, it is conceivable to adopt a fluororubber as a sealing rubber material around a fuel tank. However, adoption of a fluororubber results in that a cost required for the sealing rubber material is increased to 10 times or more, thereby leading to a situation that inexpensive NBR compositions are highly demanded.

The present inventors have conducted an investigation of a reason of insolubilized substance generation, thereby resultingly confirmed that the reason resides in a wax component(s) for providing ozone resistance. Further, the present inventors have confirmed that stearic acid, which is typically blended as a processing aid, is also turned into an insolubilized substance.

However, in case that a wax component(s) is/are excluded from a blending formulation as a countermeasure to insolubilized substance generation, the ozone resistance, which is one of the important functions, is lacked; and in case that stearic acid is excluded from a blending formulation, the resultant rubber compound is caused to be deteriorated in ejectability from a kneader (pressure kneader) to be used when kneading the rubber compound; so that such exclusion leads to failure of establishment in terms of function and production.

Patent Document 1: JP-A-S63-256680
Patent Document 2: JP-A-2000-95899
Patent Document 3: JP-A-H11-304058
Patent Document 4: JP-A-2001-172433
Patent Document 5: JP-A-2006-22220

SUMMARY

As such, the present inventors have conducted investigation to provide: an NBR composition, which is substantially free of blending of stearic acid and a wax component, so as to restrict generation of an insolubilized substance, and so as to be also excellent in ozone resistance, ejectability from kneader, and the like; and a sealing rubber material to be obtained by cross-linkingly molding the NBR composition.

Polymers each comprising an NBR mixed with a PVC for provision of ozone resistance and the like have been described in Patent Documents 1 to 5, such that rubber compositions are described therein, by using a polymer obtained by blending 80 parts by weight of NBR and 20 parts by weight of PVC in Patent Document 1, by using a polymer obtained by blending 75 parts by weight of NBR and 25 parts by weight of PVC, a polymer obtained by blending 80 parts by weight of NBR and 20 parts by weight of PVC, and an NBR/PVC blend polymer (weight ratio: 70:30) in Patent Document 2, and by each using an NBR/PVC blend polymer (weight ratio: 70:30) in Patent Documents 3 to 5.

However, it has been found out that, since packings, O-rings, and the like around fuel tanks are each used in a constantly compressed state and in an environment accompanied by a temperature change from high temperature to ordinary temperature, the conventionally known rubber compositions adopting the polymers each obtained by mixing an NBR with a PVC are each apt to be deteriorated in second compression set to be measured by assuming such an environment.

The present inventors have thus conducted various investigations, and resultingly found out that, when a PVC content is kept within a particular range, it is possible to obtain a rubber composition provided with ozone resistance, ejectability from kneader, and the like and restricted in deterioration of second compression set, in a manner enabling to improve physical properties of a sealing rubber material, which is particularly used as a packing, O-ring, or the like in a fixedly compressed state.

It is therefore a first object of the present invention to provide: an NBR composition, which composition is substantially free of containment of an insolubilized substance-generating causative substance so as to prevent generation of an insolubilized substance due to extraction by a fuel while which composition is excellent in ozone resistance, ejectability from kneader, and the like; and a sealing rubber material obtained by cross-linking the NBR composition.

Further, it is a second object of the present invention to provide: an NBR composition realizing a first compression set and a second compression set which are both 46% or less; and a sealing rubber material obtained by cross-linking the NBR composition.

Other objects of the present invention will become apparent from the following description.

The objects are achieved by the following inventions.

1. An NBR composition comprising a polymer obtained by mixing an acrylonitrile-butadiene rubber (NBR) with polyvinyl chloride (PVC);
wherein the NBR composition is obtained without blending an insolubilized substance-generating causative substance, or, in case of blending, by blending an insolubilized substance-generating causative substance at an upper limit of 0.15 parts by weight or less, into 100 parts by weight of the polymer having a PVC content of 15.70 to 17.50 wt %.

2. The NBR composition according to 1., wherein the insolubilized substance-generating causative substance is a wax component and/or stearic acid.

3. The NBR composition according to 2., wherein the wax component is at least one selected from among a special wax (special microcrystalline wax), microcrystalline wax, paraffin wax, beeswax, carnauba wax, lanoline, vegetable wax, montan wax, ozokerite, Fischer-Tropsch wax, polyethylene wax, fatty acid ester-based wax, fatty acid amide, and diheptadecylketone.

4. A sealing rubber material obtained by cross-linkingly molding the NBR composition according to any one of 1. to 3.

5. The sealing rubber material according to 4., wherein the sealing rubber material has a first compression set and a second compression set measured in conformity to JIS K6262 by adopting an O-ring of size G25 as a sample, where the first compression set and second compression set are both 46% or less.

According to the present invention, it is enabled to provide: an NBR composition, which composition is substantially free of containment of an insolubilized substance-generating causative substance so as to prevent generation of an insolubilized substance due to extraction by a fuel while which composition is excellent in ozone resistance, ejectability from kneader, and the like, and which composition realizes a first compression set and a second compression set which are both 46% or less; and a sealing rubber material obtained by cross-linking the NBR composition.

DETAILED DESCRIPTION OF THE INVENTIONS

Embodiments of the present invention will be explained hereinafter.

The polymer according to the present invention is obtainable by mixing an acrylonitrile-butadiene rubber (NBR) with polyvinyl chloride (PVC), and the polymer has a PVC content in a range of 15.70 to 17.50 wt %.

It is noted that, the simple reference to "polymer" in the present invention refers to a polymer to be obtained by mixing an NBR with PVC.

Although the NBR to be used for obtaining the polymer of the present invention is not particularly limited, a high nitrile polymer, an ultrahigh nitrile polymer, and the like are preferably used.

The polymer of the present invention may be obtained by mixing simple substances of NBR and PVC, or by mixing an NBR with a blend polymer of NBR and PVC (i.e., an NBR/PVC blend polymer).

Preferable as the NBR/PVC blend polymer are those polymers each having a PVC content of 20 to 50 wt %, preferably 30 to 40 wt %. NBR/PVC blend polymers are available as commercial products, respectively, and examples thereof include NV60 (PVC content of 35%) produced by JSR corporation.

As a mixing ratio between the NBR polymer and the NBR/PVC blend polymer, it is desirable that NBR:NBR/PVC=55/45 to 50/50 in case of adopting an NBR/PVC blend polymer having a PVC content of 35%, thereby enabling to obtain a polymer having a PVC content of 15.70 to 17.50%.

In the above NBR composition, PVC contents of polymers less than 15.70% lead to deteriorated ozone resistances, and PVC contents more than 17.50% lead to deteriorated compression sets.

The compression set is one of functions to be emphasized in sealing materials such as packings, O-rings, and the like. Particularly, higher PVC contents of polymers lead to considerably deteriorated second compression sets to be each measured by assuming a usage state as a sealing material of a fuel tank (where the sealing material is subjected to a temperature change from high temperature to ordinary temperature, in a constantly compressed state).

In the present invention, the first compression set is measured in conformity to JIS K6262. Only, this is a compression set (CS) obtained by adopting an O-ring (size of G25) as a sample in a manner to heat-treat it at a compression ratio of 25% and at a test temperature of 100° C. for 70 hours, and by measuring a pertinent value by releasing a set plate just after termination of the test.

In turn, the second compression set is measured in conformity to JIS K6262. Only, this is a compression set (CS) obtained by: adopting an O-ring (size of G25) as a sample in a manner to heat-treat it at a compression ratio of 25% and at a test temperature of 100° C. for 15 hours; taking a compressing device out of a constant temperature bath, in a manner to leave the sample at an ordinary temperature while keeping a set plate clamped, without releasing the set plate immediately after the takeout; cooling the set plate down to the ordinary temperature, and then releasing it; and measuring a pertinent value of the sample.

The first compression set and second compression set are required to be 46% or less, preferably 45% or less, more preferably 40% or less because of the function of the product, and the PVC content in the range of 15.70 to 17.50 wt % is extremely important in obtaining both properties of ozone resistance and such compression sets.

The NBR composition of the present invention is substantially free of containment of an insolubilized substance-generating causative substance, which causes generation of an insolubilized substance due to extraction by a fuel. It is noted that the phrase "substantially free of containment" means that insolubilized substance-generating causative substances are not blended, or, in case of blending, the insolubilized substance-generating causative substance is contained at an upper limit of 0.15 parts by weight or less in 100 parts by weight of the polymer. Further, the phrase means that, in case of multiple kinds of insolubilized substance-generating causative substances, the total amount of such substances is limited to 0.15 parts by weight or less.

The insolubilized substance-generating causative substance is not particularly limited insofar as the same acts as a substance for causing a generation of an insolubilized substance due to extraction by a fuel, and examples thereof preferably include a wax component and stearic acid, as noted above.

It is noted that the wax component embraces: an ester of a fatty acid and a higher alcohol; and a neutral fat, a higher fatty acid, a hydrocarbon, and the like, each exhibiting natures extremely similar to those of the ester; and examples of the wax component specifically include: various natural waxes such as a special wax (special microcrystalline wax), microcrystalline wax, paraffin wax, beeswax, carnauba wax, lanoline, vegetable wax, montan wax, and ozokerite; synthesized waxes such as Fischer-Tropsch wax, polyethylene wax, fatty acid ester-based wax, fatty acid amide such as stearic acid amide, and diheptadecylketone; and blended/denatured waxes.

Examples of commercial products of special waxes include SUNTIGHT produced by Seiko Chemical Co., Ltd., OZOGUARD produced by Kawaguchi Chemical Industry Co., Ltd., SUNNOC produced by OUCHI SHINKO CHEMICAL INDUSTRIAL Co., Ltd., and VANWAX H, VANWAX OZ produced by Vanderbilt Co., Inc.

Except for the above compounds defined as the wax components, respectively, it is possible for the NBR composition of the present invention to appropriately add therein those additives such as a vulcanizing agent, a vulcanization accelerator activator, a vulcanization accelerator, an age resister, a plasticizer, a reinforcing material, or a filler, as required.

Examples of the vulcanizing agent include: inorganic vulcanizing agents such as sulfur, sulfur monochloride, selenium, tellurium; organic vulcanizing agents such as sulfur-containing organic compounds, dithiocarbamic acid salt, and oximes; and organic peroxides such as dicumyl peroxide, 2,5-dimethyl-2,5-di(tert-butylperoxy)hexane, benzoyl peroxide, dilauroyl peroxide, and 1,3-di(tert-butyl peroxyisopropyl)benzene; and sulfur is preferable among them. Examples of the sulfur include powdery sulfur, precipitated sulfur, colloidal sulfur, surface-treated sulfur, and insoluble sulfur.

When sulfur is adopted as the vulcanizing agent, its blending amount is preferably 0.05 to 5 parts by weight, more preferably 0.1 to 3 parts by weight, and further preferably 0.2 to 1 part by weight, relative to 100 parts by weight of the polymer of the present invention.

Examples of the vulcanization accelerator activator include metal oxides such as zinc oxide, active zinc white, surface-treated zinc white, complex zinc white, and magnesium oxide; metal carbonates such as zinc carbonate; and metal hydroxides such as calcium hydroxide.

Examples of the vulcanization accelerator include: sulfenamide-based compounds such as N-cyclohexyl-2-benzothiazolylsulfeneamide (CBC), N-oxydiethylene-2-benzothiazolylsulfenamide, N,N-diisopropyl-2-benzothiazolylsulfenamide; thiuram-based compounds such as tetramethylthiuram monosulfide (TMTM), tetramethylthiuram disulfide (TMTD), tetraethylthiuram disulfide (TETD), tetrabutylthiuram disulfide (TBTG), tetraoctylthiuram disulfide, pentamethylenethiuram tetrasulfide; thiazole-based compounds; and guanidine compounds; which can be used solely in one kind, or mixedly in two or more kinds.

The blending amount of the vulcanization accelerator is 0.2 to 10 parts by weight, preferably 0.3 to 7 parts by weight, relative to 100 parts by weight of the polymer.

Examples of the age resister include naphthylamine-based, diphenylamine-based, p-phenylenediamine-based, quinoline-based, hydroquinon derivative-based, (mono-, bis-, tris-, poly-)phenol-based, thiobisphenol-based, hindered phenol-based, phosphorous acid ester-based, imidazole-based, dithiocarbamic acid nickel salt-based, and phosphoric acid-based age resisters, and the like.

Examples of the plasticizer include phthalic acid esters, and fatty acid esters such as diethylhexyl adipate.

Examples of the reinforcing material include carbon black, silica, aluminum hydroxide, and alumina. Among them, carbon black is preferable.

The blending amount of the reinforcing material is preferably 5 to 200 parts by weight, more preferably 10 to 100 parts by weight, and particularly preferably 20 to 80 parts by weight, relative to 100 parts by weight of the polymer.

Preparation of the NBR composition can be conducted by kneading the above explained components, by a hermetically sealed kneader such as a pressure kneader and a Banbury mixer, or an open kneader such as an open roll mill.

The NBR composition of the present invention is preferably usable as a sealing rubber material, and particularly as a packing or O-ring to be used in a fixedly compressed state around a fuel tank, for example.

The sealing rubber material of the present invention is obtained by cross-linkingly molding the above described NBR composition of the present invention, and the cross-linking molding (vulcanization) is to be preferably conducted by heating compression such as press vulcanization, injection molding vulcanization, or infusion molding vulcanization typically at 150° C. to 250° C. for about 1 to 30 minutes, and oven vulcanization or steam vulcanization is further conducted as secondary vulcanization at about 150° C. to 200° C. for about 1 to 24 hours, as required.

EXAMPLES

Although the effect of the present invention will be exemplified hereinafter by Examples, the present invention is not limited to such Examples.

Example 1

Polymer:
High nitrile (NBR) polymer (Nipol DN101 produced by Nippon Zeon Co., Ltd.; nitrile content: 42.5%, Mooney viscosity [$ML_{1+4}$(100° C.)]=77.5)
55 parts by weight
NBR/PVC blend polymer (NV60 produced by JSR corporation; PVC content: 35%)
45 parts by weight
Compounding ingredient:
SRF class carbon black (SEAST G-S produced by Tokai Carbon Co., Ltd.)
70 parts by weight
Zinc oxide (Special number of zinc oxide produced by Seido Chemical Industry Co., Ltd.)
5 parts by weight
Age resister (NONFLEX RD produced by Seiko Chemical Co., Ltd.)
2 parts by weight
Plasticizer (Ethyl hexyl adipate)
30 parts by weight
Sulfur
0.5 part by weight
Vulcanization accelerator
CBS (NOXELER CZ produced by OUCHI SHINKO CHEMICAL INDUSTRIAL Co., Ltd.)
2 parts by weight
TMTD (NOXELER TET produced by OUCHI SHINKO CHEMICAL INDUSTRIAL Co., Ltd.)
2.5 parts by weight The above compound except for the vulcanization accelerators was kneaded by a hermetically sealed pressure kneader (3 L), followed by addition of the vulcanization accelerator thereto by an open roll mill.

The resultant compound was introduced into molds for 2 mm sheet and O-ring, respectively, followed by molding (primary vulcanization) by heating at 160 to 180° C. for 10 to 20 minutes, and by a subsequent heat treatment (secondary vulcanization) in an air circulating oven at 160° C. for 1 hour.

<Evaluation Manner>

PVC Content:
PVC content in the applicable polymer was indicated in wt %.

Ejectability from Kneader:
Each rubber composition after kneading the applicable compound except for the vulcanization accelerators, was evaluated for a ejectability upon ejection from the kneader based on the following criterion, and the result is shown in Table 1.

x: In case that the applicable rubber was adhered to a rotor of the kneader, and 10 minutes or more were required to eject the rubber.

○: In case that the applicable rubber was not adhered to a rotor of the kneader, and the rubber was allowed to be relatively easily ejected therefrom.

Rubber Hardness Hs:

This was measured by a type A durometer (momentary) in conformity to JIS K6253:1997.

Generation of Precipitation:

Each cross-linkedly molded product in a shape of 2 mm-sheet was cut into rubber pieces of about 5 mm×5 mm, followed by immersion of 20 g of rubber pieces into 50 ml of fuel oil (Fuel C: toluene/isooctane=50:50 (volume ratio), JIS K6258), and they were left to stand still at 40° C. for 5 days.

Next, the rubber pieces were taken out of the immersion liquid, which was then concentrated to 10 ml and left to stand still at −15° C. for 5 hours to thereby promote formation of suspended matters, followed by immediate centrifugal separation at 2,000 rpm for 5 minutes in an atmosphere at an ordinary temperature, thereby precipitating the suspended matters.

The applicable product was evaluated to be "⊚" for the precipitate of 0.05 ml or less, "○" for the precipitate less than 0.1 ml, or "x" for the precipitate of 0.1 ml or more. It is noted that no problems are caused in function, by precipitates less than 0.1 ml.

First Compression Set Cs:

Measurement was performed in conformity to JIS K6262. Only, an O-ring (size G25) was adopted as a sample, and subjected to heat treatment at a test temperature of 100° C. for 70 hours, at a compression ratio: 25%. Judging from a function of a product, it is desirable for this characteristic value to be 46% or less, preferably 40% or less.

Second Compression Set Cs:

Measurement was performed in conformity to JIS K6262. Only, each sample was heat-treated at a compression ratio of 25% and at a test temperature of 100° C. for 15 hours; the compressing device was taken out of the constant temperature bath in a manner to leave the sample at an ordinary temperature while keeping the set plate clamped without releasing the set plate immediately after the takeout; and the set plate was then cooled down to the ordinary temperature. The set plate was released in a state that the same was brought to the ordinary temperature, in a manner to measure a pertinent value of the sample after 30 minutes from the releasement, thereby obtaining its compression set (%). Judging from a function of a product, it is desirable for this characteristic value to be 46% or less, preferably 40% or less.

Ozone Resistance:

Test and evaluation were conducted in conformity to JIS K6259 (40° C., ozone concentration of 50 pphm, 70 hours). Those samples having no cracks were each indicated as "N.C.". Those samples having recognized cracks were each evaluated in accordance with an evaluation manner of crack as described in JIS K6259 Appendix 1. Judging from a function of a product, "N.C." is preferable.

Low-Temperature Performance (TR-10):

This was measured in conformity to JIS K6261. Judging from a function, −25° C. or lower is preferable, and −30° C. or lower is more preferable.

Example 2

Evaluations were conducted in the same manner as Example 1, except for alternative adoption of 50 parts by weight of high nitrile polymer, and 50 parts by weight of NBR/PVC blend polymer.

Example 3

Evaluations were conducted in the same manner as Example 1, except for addition of 0.05 part by weight of stearic acid, and 0.05 part by weight of wax (SUNTIGHT R produced by Seiko Chemical Co., Ltd.).

Comparative Example 1

Evaluations were conducted in the same manner as Example 1, except for alternative adoption of 100 parts by weight of high nitrile polymer, and except for omission of blending of NBR/PVC blend polymer.

Comparative Example 2

Evaluations were conducted in the same manner as Example 1, except for alternative adoption of 60 parts by weight of high nitrile polymer, and 40 parts by weight of NBR/PVC blend polymer.

Comparative Example 3

Evaluations were conducted in the same manner as Example 1, except for alternative adoption of 45 parts by weight of high nitrile polymer, and 55 parts by weight of NBR/PVC blend polymer.

Comparative Example 4

Evaluations were conducted in the same manner as Comparative Example 1, except for addition of 1 part by weight of stearic acid, and 3 parts by weight of wax.

Comparative Example 5

Evaluations were conducted in the same manner as Example 1, except for addition of 1 part by weight of stearic acid.

Comparative Example 6

Evaluations were conducted in the same manner as Example 1, except for addition of 1 part by weight of wax.

Comparative Example 7

Evaluations were conducted in the same manner as Example 1, except for addition of 0.5 part by weight of stearic acid, and 0.5 wt % of wax.

Comparative Example 8

Evaluations were conducted in the same manner as Example 1, except for addition of 0.1 part by weight of stearic acid, and 0.1 part by weight.

Shown in Table 1 are formulations and evaluation results of Examples 1 to 3 and Comparative Examples 1 to 8.

|  |  | Example 1 | Example 2 | Example 3 | Comparative Example 1 | Comparative Example 2 | Comparative Example 3 |
|---|---|---|---|---|---|---|---|
| Polymer [parts by weight] | NBR polymer | 55 | 50 | 55 | 100 | 60 | 45 |
|  | PVC polymer |  |  |  |  |  |  |
|  | NBR/PVC blend polymer (PVC content: 35 wt %) | 45 | 50 | 45 |  |  |  |
|  | NBR/PVC blend polymer (PVC content: 30 wt %) |  |  |  |  | 40 | 55 |
|  | PVC content: (wt %) | 15.75 | 17.50 | 15.75 | — | 14.00 | 19.25 |
| Compounding ingredient [parts by weight] | SRF class carbon black | 70 | 70 | 70 | 70 | 70 | 70 |
|  | Carbon black |  |  |  |  |  |  |
|  | Zinc oxide | 5 | 5 | 5 | 5 | 5 | 5 |
|  | Stearic acid |  |  | 0.05 |  |  |  |
|  | Wax |  |  | 0.05 |  |  |  |
|  | Age resister | 2 | 2 | 2 | 2 | 2 | 2 |
|  | Plasticizer | 30 | 30 | 30 | 30 | 30 | 30 |
|  | Sulfur | 0.5 | 0.5 | 0.5 | 0.5 | 0.5 | 0.5 |
|  | Vulcanization accelerator  CBS | 2 | 2 | 2 | 2 | 2 | 2 |
|  | TMTD | 2.5 | 2.5 | 2.5 | 2.5 | 2.5 | 2.5 |
|  | MBTS |  |  |  |  |  |  |
| Evaluation | Dischargeablity from kneader | ○ | ○ | ○ | X | ○ | ○ |
|  | Rubber hardness Hs | 71 | 71 | 71 | 71 | 71 | 71 |
|  | Generation of precipitate | ◎ | ○ | ○ | ○ | ○ | ○ |
|  | First compression set (%) | 40 | 43 | 41 | 31 | 39 | 47 |
|  | Second compression set (%) | 37 | 44 | 37 | 30 | 36 | 52 |
|  | Ozone resistance | N.C | N.C | N.C | B-3 | A-2 | N.C |
|  | TR-10 (° C.) | -30 | -30 | -30 | -30 | -30 | -30 |

|  |  | Comparative Example 4 | Comparative Example 5 | Comparative Example 6 | Comparative Example 7 | Comparative Example 8 |
|---|---|---|---|---|---|---|
| Polymer [parts by weight] | NBR polymer | 100 | 55 | 55 | 55 | 55 |
|  | PVC polymer |  |  |  |  |  |
|  | NBR/PVC blend polymer (PVC content: 35 wt %) |  | 45 | 45 | 45 | 45 |
|  | NBR/PVC blend polymer (PVC content: 30 wt %) |  |  |  |  |  |
|  | PVC content: (wt %) | — | 15.75 | 15.75 | 15.75 | 15.75 |
| Compounding ingredient [parts by weight] | SRF class carbon black | 70 | 70 | 70 | 70 | 70 |
|  | Carbon black |  |  |  |  |  |
|  | Zinc oxide | 5 | 5 | 5 | 5 | 5 |
|  | Stearic acid | 1 | 1 |  | 0.5 | 0.1 |
|  | Wax | 3 |  | 1 | 0.5 | 0.1 |
|  | Age resister | 2 | 2 | 2 | 2 |  |
|  | Plasticizer | 30 | 30 | 30 | 30 | 30 |
|  | Sulfur | 0.5 | 0.5 | 0.5 | 0.5 | 0.5 |
|  | Vulcanization accelerator  CBS | 2 | 2 | 2 | 2 | 2 |
|  | TMTD | 2.5 | 2.5 | 2.5 | 2.5 | 2.5 |
|  | MBTS |  |  |  |  |  |
| Evaluation | Dischargeablity from kneader | ○ | ○ | ○ | ○ | ○ |
|  | Rubber hardness Hs | 70 | 71 | 70 | 71 | 70 |
|  | Generation of precipitate | X | X | X | X | X |
|  | First compression set (%) | 32 | 40 | 42 | 40 | 41 |
|  | Second compression set (%) | 32 | 35 | 37 | 35 | 35 |
|  | Ozone resistance | N.C | N.C | N.C | N.C | N.C |
|  | TR-10 (° C.) | -31 | -30 | -30 | -30 | -30 |

The NBR composition, where the polymer did not contain PVC, without blending of stearic acid and a wax, was considerably deteriorated in ejectability from kneader, ozone resistance, and the like (Comparative Example 1).

The ozone resistance was deteriorated when the PVC content was less than 15.70% (Comparative Example 2), while the compression set exceeded 46% when the PVC content was greater than 17.50% (Comparative Example 3).

Even when the PVC content in the applicable polymer was 15.75%, precipitate was caused due to a total blending amount of stearic acid and a wax component exceeding 0.15 part by weight (Comparative Examples 5 to 8).

I claim:

1. A sealing rubber material obtained by cross-linkingly molding an acrylonitrile-butadiene rubber (NBR) composition by using sulfur as a vulcanizing agent;
wherein the NBR composition comprises a polymer obtained by mixing an NBR with polyvinyl chloride;
wherein the NBR composition is obtained by blending an insolubilized substance-generating causative substance within a limit of 0 to 0.15 parts by weight, into 100 parts by weight of the polymer having a PVC content of 15.70 to 17.50 wt %; and
wherein the insolubilized substance-generating causative substance is a wax component and/or stearic acid.

2. The sealing rubber material according to claim 1, wherein the sealing rubber material has a first compression set and a second compression set measured in conformity to JIS K6262 by adopting an O-ring of size G25 as a sample, where the first compression set and second compression set are both 46% or less.

3. The sealing rubber material according to claim 1, wherein the wax component is selected from the group consisting of microcrystalline wax, paraffin wax, beeswax, carnauba wax, lanoline, vegetable wax, montan wax, ozokerite, Fischer-Tropsch wax, polyethylene wax, fatty acid ester-based wax, fatty acid amide, and diheptadecylketone.

* * * * *